Patented Feb. 24, 1925.

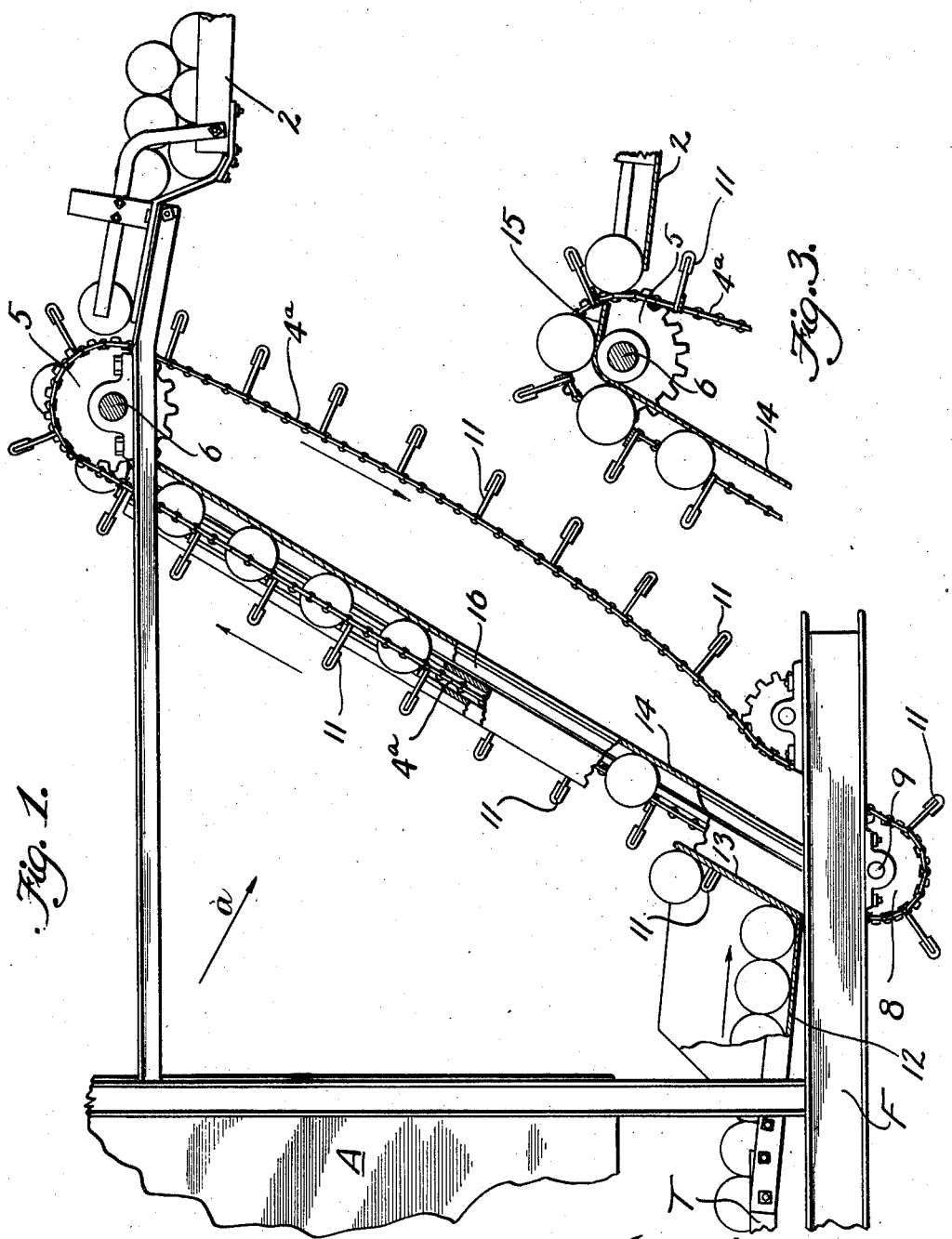

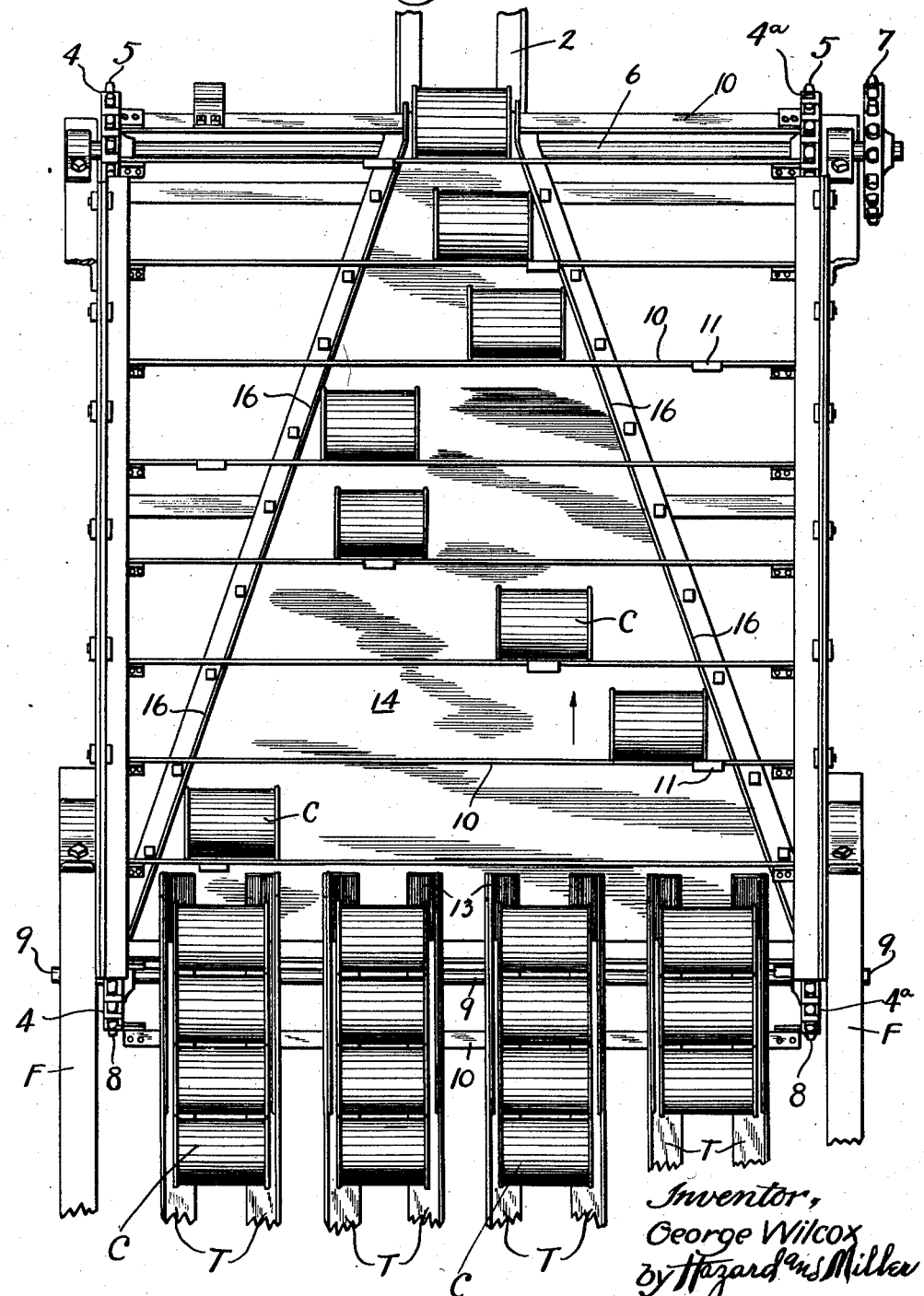

1,527,337

UNITED STATES PATENT OFFICE.

GEORGE WILCOX, OF RIVERSIDE, CALIFORNIA, ASSIGNOR TO CALIFORNIA CANNING MACHINERY COMPANY, OF RIVERSIDE, CALIFORNIA, A CORPORATION OF CALIFORNIA.

CAN CONVEYER.

Application filed November 24, 1922. Serial No. 603,097.

*To all whom it may concern:*

Be it known that I, GEORGE WILCOX, a citizen of the United States, residing at Riverside, in the county of Riverside and State of California, have invented new and useful Improvements in Can Conveyers, of which the following is a specification.

This invention relates to can handling apparatus and more particularly to can conveyers.

It is an object of the present invention to provide means for collecting cans as they come from cookers, containers, or the like, and for so shifting the cans as they are discharged from parallel conveyers as to bring all of the cans into a single row where they may be discharged onto a single receiving conveyer.

It is another object to provide a collecting and can shifting conveyer of large capacity and rapid and effective operation and simple and practical construction.

Other objects and advantages will be made manifest in the following specification of an embodiment of the invention illustrated in the accompanying drawings, wherein, Figure 1 is vertical section and partial side elevation of the improved conveyer shown in combination with a cooker.

Fig. 2 is a side elevation looking in the direction of the arrow A, Fig. 1, and showing the cooker conveyers in plan.

Fig. 3 is a detail vertical section of the head sprocket and conveyer.

Types of cookers in which loaded and sealed cans C are traversed are usually provided with a plurality of longitudinally extending tracks or guides T, Fig. 2, which discharge the cans from one end of the cooker.

The present invention consists of means for collecting the cans from the series of tracks T and conveying them upwardly and discharging them onto a single distributing chute or conveyer indicated at 2. The receiving and conveying apparatus, in its present form, is shown as comprising a pair of spaced sprocket chains 4 and 4ᵃ engaging head sprocket wheels 5 which are secured on a head shaft 6 driven by any suitable means, as for instance by a sprocket wheel 7 engaged by a driving sprocket chain not shown.

The parallel sprocket chains 4—4ᵃ extend downwardly and rearwardly to foot sprockets 8 on a shaft 9 shown as arranged below framework F which may consist of a part of the cooker apparatus A.

The spaced sprocket chains 4—4ᵃ are transversely connected by a series of transverse parallel and substantially equally spaced slats or bars 10, and each of these bars is provided with an outwardly extending horn 11. The horns of every fourth bar 10 of the series are in alinement with one or another of the discharge tracks T. Thus as shown in Fig. 1 it will be seen that the horns 11 closest to one side of the cooker are in alinement with the first track T; the horns 11 of another set of bars are in alinement with the second track T, and the next successive series of horns are in alinement with the third track, and the last series of horns are in alinement with the track nearest the opposite side of the cooker so that as cans successively discharge from the cooker tracks, they will be picked up in a sequence determined by the successive presentation of the offset horns along the carrier bars 10.

To facilitate the control operation, there is arranged contiguous to the discharge ends of the tracks T an apron 12 downwardly inclined slightly and having an upturned flange 13 which is slotted to provide clearance for the horns 11 of the conveyer, the lower end of which is so arranged that the horns 11 will sweep up through the apron 12 and move upwardly along the slotted flange 13. Cans C discharging from the tracks T will back up in the apron 12 with one can resting against the flange 13 in such position as to be engaged by the respective conveyer horn 11. Thus the horn of every fourth conveyer bar 10 is moved against the present can and the latter is shifted upwardly along the flange 13 and falls over the end thereof down to and rests upon a guide plate 14 arranged below the upper stretch of the conveyer wheel bars 10, which at this time, engage the lower surfaces of the cans and push the same upwardly along the plate 14 to the top thereof, which is shown as bent around the head shaft 6 and is provided with a lip 15 from which the cans are dropped onto the chute 2.

Since it is desirable to converge all of the cans from the series of tracks 10 to the single distributing chute 2, means are provided for acting upon the cans C as they are carried upwardly by the conveyer and while they rest upon the back plate 14. Suitable means are therefore provided as including upwardly and convergently disposed guide rails 16, Fig. 2, the upper ends of which are disposed contiguous to the receiving end of the chute 2. Thus, the lower divergent ends of the guide rails 16 will engage those cans coming from the outermost cooker tracks T, and as the cans are lifted by the elevating conveyer they will be shifted inwardly by axial movement gradually to the top of the guide rails to register with the distributor chute 2.

From the above it will be seen that the invention provides for the automatic collection and shifting of the cans as they come from various spaced tracks and the orderly arrangement of the cans so that they will be discharged onto a single distributing means.

By the provision of but one can engaging horn on each conveyer 10, it will be seen that jamming of cans by reason of a collection of more than one can on a bar, is wholly overcome; the excess number of cans collecting in the apron 12 wherefrom only one can at a time can be selected from its position at the discharge end of each track.

Further embodiments, modifications and changes may be resorted to within the spirit of the invention as here claimed.

What is claimed is:

1. A can conveyer comprising a back plate, guide rails secured to the back plate, said guide rails being wide enough apart at their receiving ends to receive cans from a plurality of chutes, and said guide rails converging toward their discharge ends to pass a single can, sprocket wheels mounted at the sides of the back plate, endless chains upon the sprocket wheels, one chain at each side edge of the back plate, carrier bars connecting the endless chains and spaced apart, said carrier bars running over the guide bars, a plurality of chutes discharging onto the back plate between the guide bars and over the carrier bars, and horns projecting from the carrier bars, each carrier bar having a horn for one chute and the horns being staggered so as to take one can from each chute in succession.

2. A can conveying apparatus comprising a back plate, converging guide bars upon the back plate, endless chains carrying carrier bars over the guide bars, a plurality of chutes discharging toward the back plate over the guide bars, and a horn upon each carrier bar to remove a can from a chute, the horns of an adjacent series of carrier bars being staggered to remove a can from each chute successively.

3. In a can conveying apparatus, traveling, parallel conveying bars each bar having a can collecting horn, and means for shifting the cans along the bars to a single location of discharge.

4. In a can conveying apparatus, traveling, parallel conveying bars each bar having a can collecting horn, and means for shifting the cans along the bars to a single location of discharge, the collecting horns of the bars being progressively offset in predetermined sets of bars.

5. In a can conveying apparatus, a back plate, guide bars mounted upon the back plate and converging from the rear end forwardly, carrier bars mounted to move over the guide bars, each carrier bar having a can collecting horn, and a plurality of chutes for discharging cans to the carrier bars at the receiving ends of the guide bars.

In testimony whereof I have signed my name to this specification.

GEORGE WILCOX.